(12) United States Patent
Chou et al.

(10) Patent No.: US 10,712,542 B2
(45) Date of Patent: *Jul. 14, 2020

(54) IMAGING LENS ASSEMBLY AND ELECTRONIC DEVICE

(71) Applicant: LARGAN PRECISION CO., LTD., Taichung (TW)

(72) Inventors: Ming-Ta Chou, Taichung (TW); I-Wei Lai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,830

(22) Filed: Sep. 10, 2019

(65) Prior Publication Data

US 2020/0003999 A1 Jan. 2, 2020

Related U.S. Application Data

(63) Continuation of application No. 15/201,656, filed on Jul. 5, 2016, now Pat. No. 10,451,852.

(30) Foreign Application Priority Data

May 9, 2016 (TW) .............................. 105114304 A

(51) Int. Cl.
 *G02B 13/00* (2006.01)
 *G02B 1/04* (2006.01)
 (Continued)

(52) U.S. Cl.
 CPC ......... *G02B 13/0055* (2013.01); *G02B 1/041* (2013.01); *G02B 1/11* (2013.01); *G02B 5/003* (2013.01); *G02B 13/002* (2013.01)

(58) Field of Classification Search
 CPC .. G02B 13/00; G02B 13/0055; G02B 13/002; G02B 1/04; G02B 1/041; G02B 1/11;
 (Continued)

(56) References Cited

U.S. PATENT DOCUMENTS

| 6,466,376 B1 | 10/2002 | Koshimizu et al. |
| 7,391,457 B2 | 6/2008 | Fujimoto et al. |

(Continued)

FOREIGN PATENT DOCUMENTS

| CN | 204359995 U | 5/2015 |
| TW | 200624872 A | 7/2006 |

(Continued)

*Primary Examiner* — Jie Lei

(74) *Attorney, Agent, or Firm* — McClure, Qualey & Rodack, LLP

(57) ABSTRACT

An imaging lens assembly includes a plurality of lens elements, wherein at least one of the lens elements is a dual molded lens element. The dual molded lens element includes a light transmitting portion and a light absorbing portion. The light transmitting portion includes an effective optical section and a first annular surface. The light absorbing portion is located on at least one surface of an object-side surface and an image-side surface of the dual molded lens element, wherein a plastic material and a color of the light absorbing portion are different from a plastic material and a color of the light transmitting portion, and the light absorbing portion includes an opening and a second annular surface. A step surface of the second annular surface is formed by the first annular surface and the second annular surface.

14 Claims, 20 Drawing Sheets

(51) Int. Cl.
*G02B 1/11* (2015.01)
*G02B 5/00* (2006.01)

(58) Field of Classification Search
CPC .......... G02B 5/00; G02B 5/003; G02B 5/005; G02B 27/0018; G02B 7/021; G02B 7/02; G02B 7/026; G02B 13/18
USPC ................. 359/614, 611, 738, 811, 819, 830
See application file for complete search history.

(56) References Cited

U.S. PATENT DOCUMENTS

| | | | |
|---|---|---|---|
| 8,031,412 B2 | 10/2011 | Shintani | |
| 8,102,609 B2 | 1/2012 | Tsuchiya et al. | |
| 8,455,810 B2 | 6/2013 | Tomioka et al. | |
| 8,736,989 B2 | 5/2014 | Wu | |
| 8,817,396 B2 | 8/2014 | Mori et al. | |
| 8,947,795 B2 | 2/2015 | Kobayashi et al. | |
| 8,964,313 B2 | 2/2015 | Kobayashi et al. | |
| 8,964,314 B2 | 2/2015 | Koike et al. | |
| 8,985,789 B2 | 3/2015 | Cho et al. | |
| 9,158,037 B2 | 10/2015 | Otsuka et al. | |
| 9,341,813 B1 | 5/2016 | Lin et al. | |
| 2004/0263994 A1 | 12/2004 | Sayag | |
| 2009/0185291 A1 | 7/2009 | Tsuchiya et al. | |
| 2014/0334019 A1 | 11/2014 | Ishiguri et al. | |
| 2014/0347752 A1 | 11/2014 | Koike et al. | |
| 2015/0103407 A1 | 4/2015 | Chen | |
| 2015/0323757 A1 | 11/2015 | Bone | |
| 2016/0091631 A1 | 3/2016 | Choi | |

FOREIGN PATENT DOCUMENTS

| | | |
|---|---|---|
| TW | 201423249 A | 6/2014 |
| TW | 201516480 A | 5/2015 |
| TW | 201543100 A | 11/2015 |

IMAGING LENS ASSEMBLY AND ELECTRONIC DEVICE

RELATED APPLICATIONS

This application is a Continuation of application Ser. No. 15/201,656, filed Jul. 05, 2016, now U.S. Pat. No. 10,451,852, which claims priority to Taiwan Application Serial Number 105114304, filed May 09, 2016, which is herein incorporated by reference.

BACKGROUND

Technical Field

The present disclosure relates to an imaging lens assembly. More particularly, the present disclosure relates to a compact imaging lens assembly which is applicable to electronic devices.

Description of Related Art

Due to the popularity of personal electronic products and mobile communication products having camera functionalities, such as smart phones and tablet personal computers, the demand for compact imaging lens assemblies has been increasing and the requirements for high resolution and image quality of present compact imaging lens assemblies increase significantly.

A plastic lens element is generally used to effectively reduce the manufacturing cost of the imaging lens assembly. A conventional plastic lens element is typically formed by an injection molding method and has a smooth and bright surface, which is featured with high reflectivity. Accordingly, when the stray light is reflected from the surfaces of other optical elements of the imaging lens assembly to the surface of the plastic lens element, the stray light reflected from the surface of the plastic lens element cannot be effectively attenuated and would be incident on the surfaces of lens elements of the imaging lens assembly.

Some conventional methods for suppressing the stray light, such as applying ink on the lens elements, and the optical refractive index matching layer configured in a gap between the black barrel and the lens element have been developed. However, there are many limitations in implementation, so that they are difficult to be applied in compact and high-precision plastic lens elements.

Hence, how to meet the requirements of suppressing the stray light of the compact imaging lens assemblies has become one of the important subjects, so that the image quality of the compact imaging lens assemblies can be enhanced, and the requirements of high-end optical systems with camera functionalities can be satisfied.

SUMMARY

According to one aspect of the present disclosure, an imaging lens assembly includes a plurality of lens elements, wherein at least one of the lens elements is a dual molded lens element. The dual molded lens element includes a light transmitting portion and a light absorbing portion. The light transmitting portion includes an effective optical section and a first annular surface. The first annular surface is located on a lens annular surface of the dual molded lens element, wherein the lens annular surface connects an object-side surface and an image-side surface of the dual molded lens element. The light absorbing portion is located on at least one surface of the object-side surface and the image-side surface of the dual molded lens element, wherein a plastic material and a color of the light absorbing portion are different from a plastic material and a color of the light transmitting portion, and the light absorbing portion includes an opening and a second annular surface. The opening is disposed correspondingly to the effective optical section. The second annular surface is located on the lens annular surface of the dual molded lens element and connected to the first annular surface, wherein a step surface of the second annular surface is formed by the first annular surface and the second annular surface. When a maximum outer diameter of the light transmitting portion is $\psi W$, and a maximum outer diameter of the light absorbing portion is $\psi B$, the following conditions are satisfied: $\psi B > \psi W$; and 0.03 mm $< (\psi B - \psi W)/2 < 0.75$ mm.

According to another aspect of the present disclosure, an electronic device includes an imaging lens module, wherein the imaging lens module includes the imaging lens assembly according to the foregoing aspect and an image sensor. The image sensor is disposed on an image surface of the imaging lens assembly.

According to another aspect of the present disclosure, an imaging lens assembly includes a plurality of lens elements, wherein at least one of the lens elements is a dual molded lens element. The dual molded lens element includes a light transmitting portion and a light absorbing portion. The light transmitting portion includes an effective optical section and a first annular surface. The first annular surface is located on a lens annular surface of the dual molded lens element, wherein the lens annular surface connects an object-side surface and an image-side surface of the dual molded lens element. The light absorbing portion is located on at least one surface of the object-side surface and the image-side surface of the dual molded lens element, wherein a plastic material and a color of the light absorbing portion are different from a plastic material and a color of the light transmitting portion, and the light absorbing portion includes an opening and a second annular surface. The opening is disposed correspondingly to the effective optical section. The second annular surface is located on the lens annular surface of the dual molded lens element and connected to the first annular surface, wherein a step surface of the second annular surface is formed by the first annular surface and the second annular surface. When a maximum outer diameter of the light transmitting portion is $\psi W$, and a maximum outer diameter of the light absorbing portion is $\psi B$, the following condition is satisfied: $0.82 < \psi W / \psi B \leq 0.99$.

According to another aspect of the present disclosure, an electronic device includes an imaging lens module, wherein the imaging lens module includes the imaging lens assembly according to the foregoing aspect and an image sensor. The image sensor is disposed on an image surface of the imaging lens assembly.

DETAILED DESCRIPTION

1st Embodiment

Figure 1A:
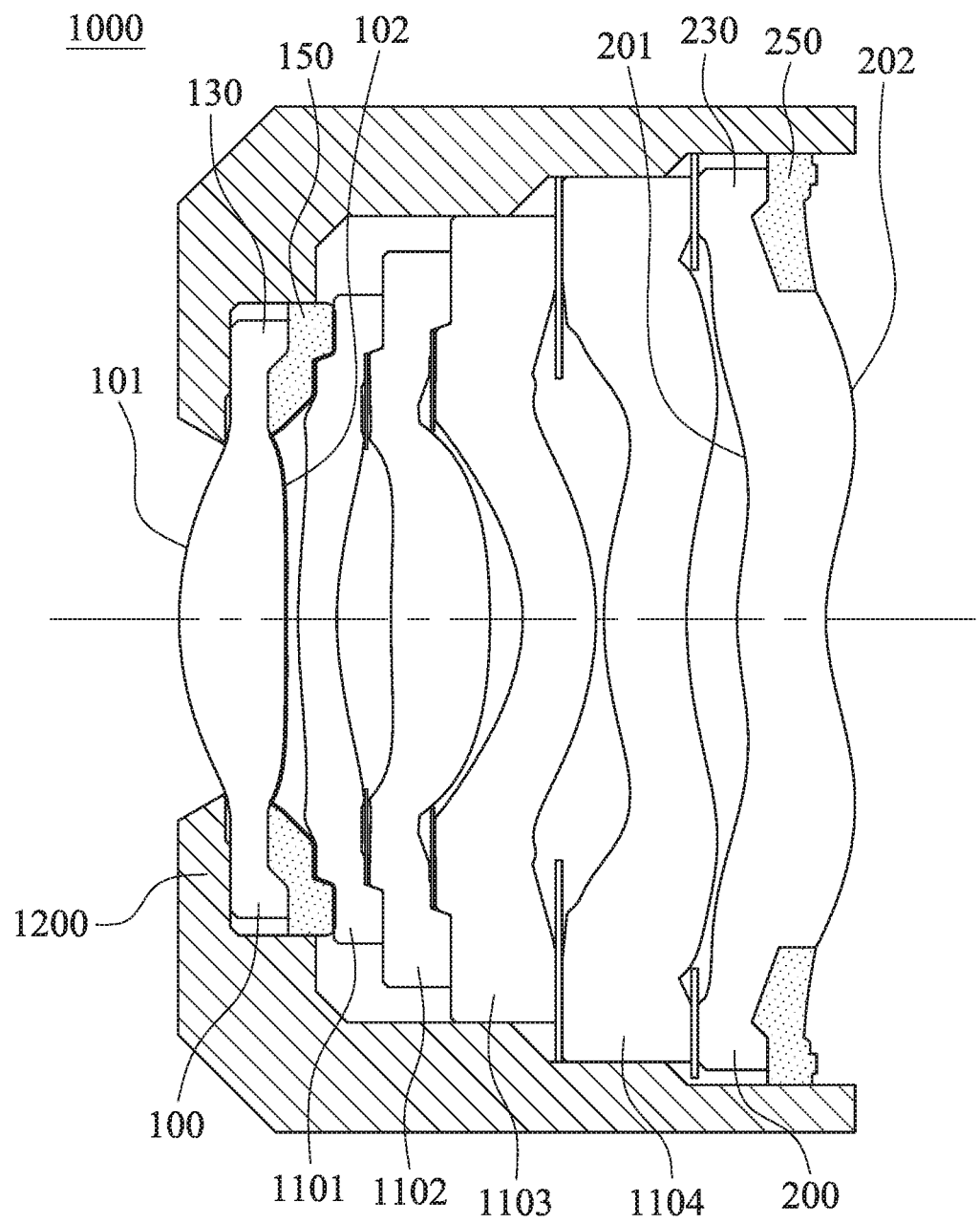
FIG. 1A is a schematic view of an imaging lens assembly according to the 1st embodiment of the present disclosure.

FIG. 1A is a schematic view of an imaging lens assembly 1000 according to the 1st embodiment of the present disclosure. In FIG. 1A, the imaging lens assembly 1000 includes a plurality of lens elements, wherein two of the lens elements are dual molded lens elements 100 and 200.

Figure 1B:
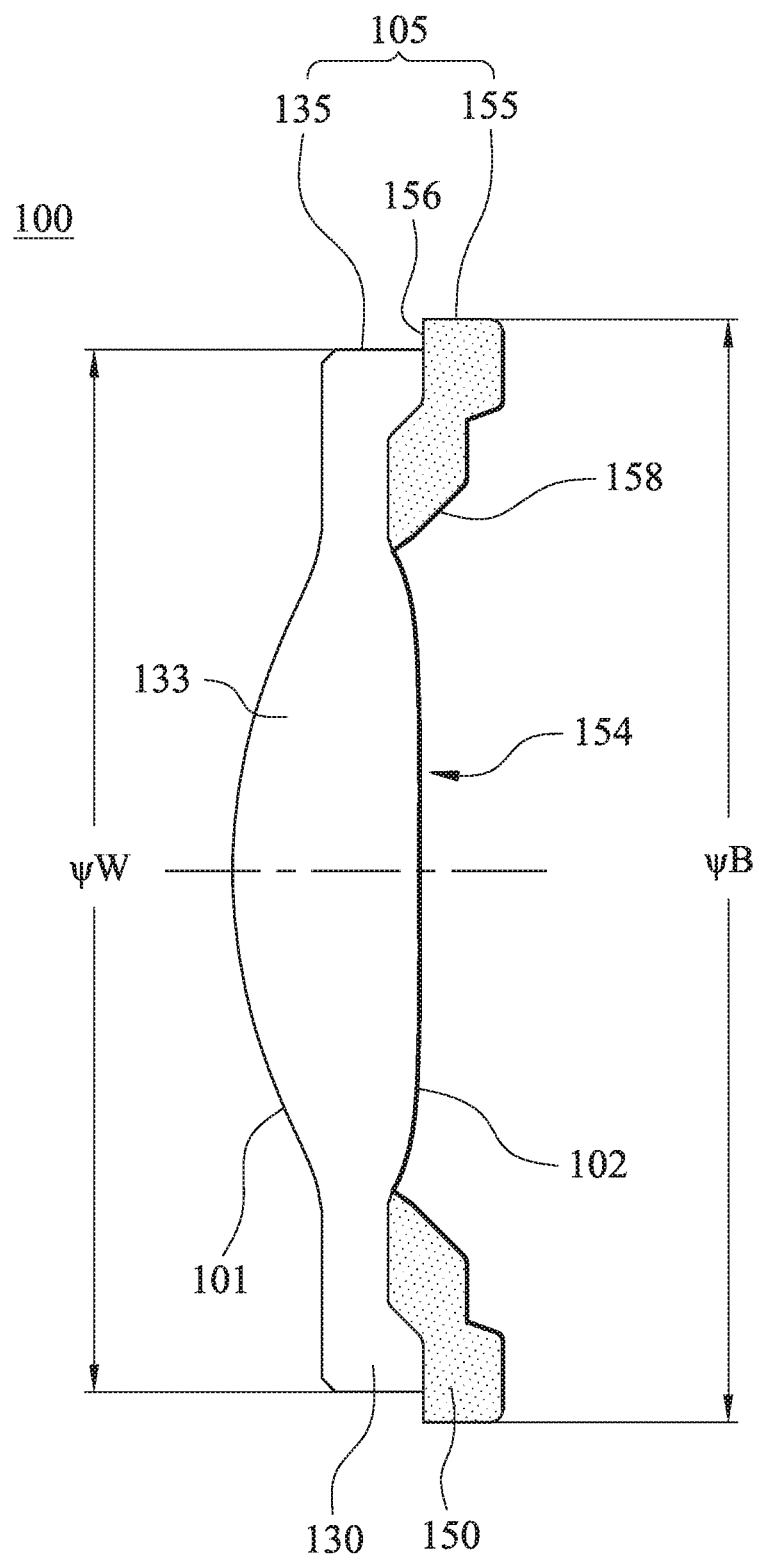
FIG. 1B is a schematic view of a dual molded lens element according to the 1st embodiment.

FIG. 1B is a schematic view of the dual molded lens element 100 according to the 1st embodiment. In FIG. 1A and FIG. 1B, the dual molded lens element 100 includes a light transmitting portion 130 and a light absorbing portion 150, wherein the light transmitting portion 130 and the light absorbing portion 150 of the dual molded lens element 100 are formed by a dual-shot injection molding method or a dual-shot molding method.

The dual molded lens element 100 has an object-side surface 101, an image-side surface 102 and a lens annular surface 105. The object-side surface 101 is a surface facing an imaged object (not shown herein) of the dual molded lens element 100. The image-side surface 102 is a surface facing an image surface (not shown herein) of the dual molded lens element 100. The lens annular surface 105 connects the object-side surface 101 and the image-side surface 102, and has an annular shape.

The light transmitting portion 130 includes an effective optical section 133 and a first annular surface 135, wherein an incident light passes through the effective optical section 133 and forms the image on the image surface. Each surface of the effective optical section 133 can be a planar surface or a surface being aspheric with any curvature, wherein it would affect imaging properties by blocking the effective optical section 133. The first annular surface 135 is located on the lens annular surface 105 of the dual molded lens element 100.

The light absorbing portion 150 is located on one surface of the object-side surface 101 and the image-side surface 102 of the dual molded lens element 100 (the aforementioned surface is the image-side surface 102 in the dual molded lens element 100 of the 1st embodiment), wherein a plastic material and a color of the light absorbing portion 150 are different from a plastic material and a color of the light transmitting portion 130. In the dual molded lens element 100 of the 1st embodiment, the plastic material of the light absorbing portion 150 has the feature of absorbing visible light, and the color of the light absorbing portion 150 is black. The plastic material of the light transmitting portion 130 has the feature of being transmitted by visible light, and the color of the light transmitting portion 130 is transparent and colorless. Hence, the plastic material and the color of the light absorbing portion 150 are different from the plastic material and the color of the light transmitting portion 130. In other embodiments (not shown herein), a light absorbing portion can be located on an object-side surface of a dual molded lens element, or both of the object-side surface and an image-side surface of the dual molded lens element.

In FIG. 1B, the light absorbing portion 150 includes an opening 154 and a second annular surface 155. The opening 154 is disposed correspondingly to the effective optical section 133, so that the incident light could pass through the effective optical section 133 and forms the image on the image surface.

The second annular surface 155 is located on the lens annular surface 105 of the dual molded lens element 100 and connected to the first annular surface 135, wherein a step surface 156 of the second annular surface 155 is formed by the first annular surface 135 and the second annular surface 155. That is, a part of the second annular surface 155 is protruded more than a corresponding part of the first annular surface 135, so that the step surface 156 of the second annular surface 155 is formed by the first annular surface 135 and the second annular surface 155.

When a maximum outer diameter of the light transmitting portion 130 is $\psi W$, and a maximum outer diameter of the light absorbing portion 150 is $\psi B$, the following condition is satisfied: $\psi B > \psi W$. Therefore, it is favorable for suppressing the stray light so as to enhance the image quality of the imaging lens assembly 1000.

In detail, when the maximum outer diameter of the light transmitting portion 130 is $\psi W$, and the maximum outer diameter of the light absorbing portion 150 is $\psi B$, the following condition can be satisfied: $0.03 \text{ mm} < (\psi B - \psi W)/2 < 0.75 \text{ mm}$. Therefore, it is favorable for maintaining the sizes of the light transmitting portion 130 and the light absorbing portion 150 in a specific range so as to balance the compact size and the light blocking efficiency of the imaging lens assembly 1000. Preferably, the following condition can be satisfied: $0.03 \text{ mm} < (\psi B - \psi W)/2 < 0.42 \text{ mm}$.

When the maximum outer diameter of the light transmitting portion 130 is $\psi W$, and the maximum outer diameter of the light absorbing portion 150 is $\psi B$, the following condition can be satisfied: $0.82 < \psi W/\psi B \leq 0.99$. Therefore, it is favorable for enhancing the stray light blocking efficiency of the dual molded lens element 100.

The light transmitting portion 130 and the light absorbing portion 150 can be formed by the dual-shot injection molding method. Therefore, it is favorable for reducing process steps so as to improve the production efficiency of the dual molded lens element 100.

At least one of two surfaces of the effective optical section 133 of the light transmitting portion 130 can be aspheric. That is, at least one of a part of the effective optical section 133 located on the object-side surface 101 and a part of the effective optical section 133 located on the image-side surface 102 of the dual molded lens element 100 can be aspheric. Therefore, it is favorable for reducing aberrations. In the dual molded lens element 100 of the 1st embodiment, two surfaces of the effective optical section 133 are both aspheric. That is, the part of the effective optical section 133 located on the object-side surface 101 and the part of the effective optical section 133 located on the image-side surface 102 of the dual molded lens element 100 are both aspheric.

The light absorbing portion 150 can further include an anti-reflection coating 158 coated on at least part of a surface of the light absorbing portion 150, which is not in contact with the light transmitting portion 130. That is, the anti-reflection coating 158 can be coated on part or all area of the surface of the light absorbing portion 150, which is not connected to the light transmitting portion 130. The anti-reflection coating 158 can be coated on a surface of the light absorbing portion 150 located on the image-side surface 102, a surface of the light absorbing portion 150 located on the lens annular surface 105, or both of the aforementioned. Therefore, it is favorable for reducing the surface reflection of the dual molded lens element 100. In addition, another anti-reflection coating (its reference numeral is omitted) can be coated on a surface of the light transmitting portion 130, which is located on the image-side surface 102. In the dual molded lens element 100 of the 1st embodiment, the anti-reflection coating 158 is coated on all area of the surface of the light absorbing portion 150 located on the image-side surface 102 of the dual molded lens element 100, which is not in contact with the light transmitting portion 130. Furthermore, the anti-reflection coating 158 can be multi-layers of Silicon dioxide ($SiO_2$) and multilayers of Titanium dioxide ($TiO_2$) deposited and interactively stacked on the surface of the light absorbing portion 150, wherein the material, the number of layers and the stack type of the anti-reflection coating 158 can be adjusted as needed.

Figure 1C:
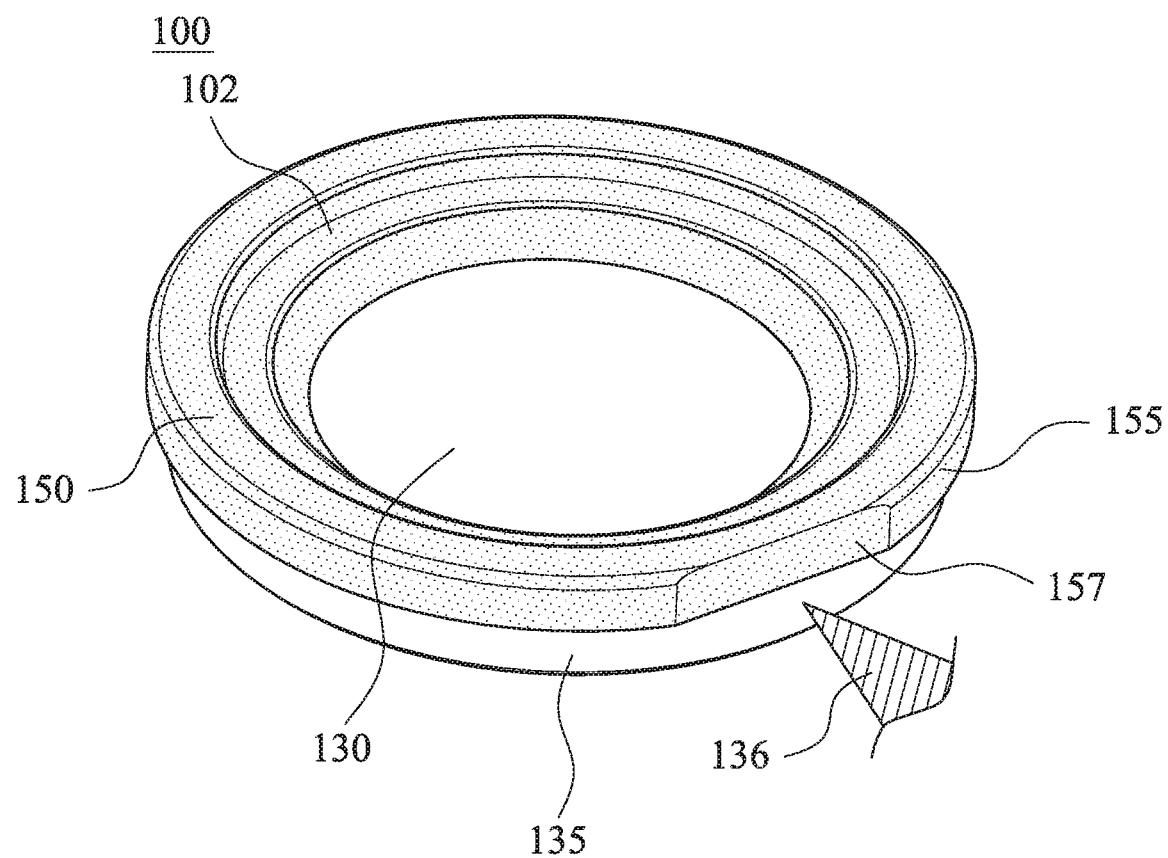
FIG. 1C is a three-dimensional view of the dual molded lens element according to the 1st embodiment.

FIG. 1C is a three-dimensional view of the dual molded lens element 100 according to the 1st embodiment. In FIG. 1C, the first annular surface 135 of the light transmitting portion 130 can include a gate trace 136. The gate trace 136 can be a trace of an injection gate, a cutting trace of an injection gate, or a protruded cutting trace of an injection gate, but not limited thereto. The types of injection materials are also not limited, wherein the mold design can be dependent on the flow properties of injection materials. Therefore, it is favorable for controlling the optical quality of the effective optical section 133 of the light transmitting portion 130 after molding so as to obtain a stable quality in production.

Figure 1D:
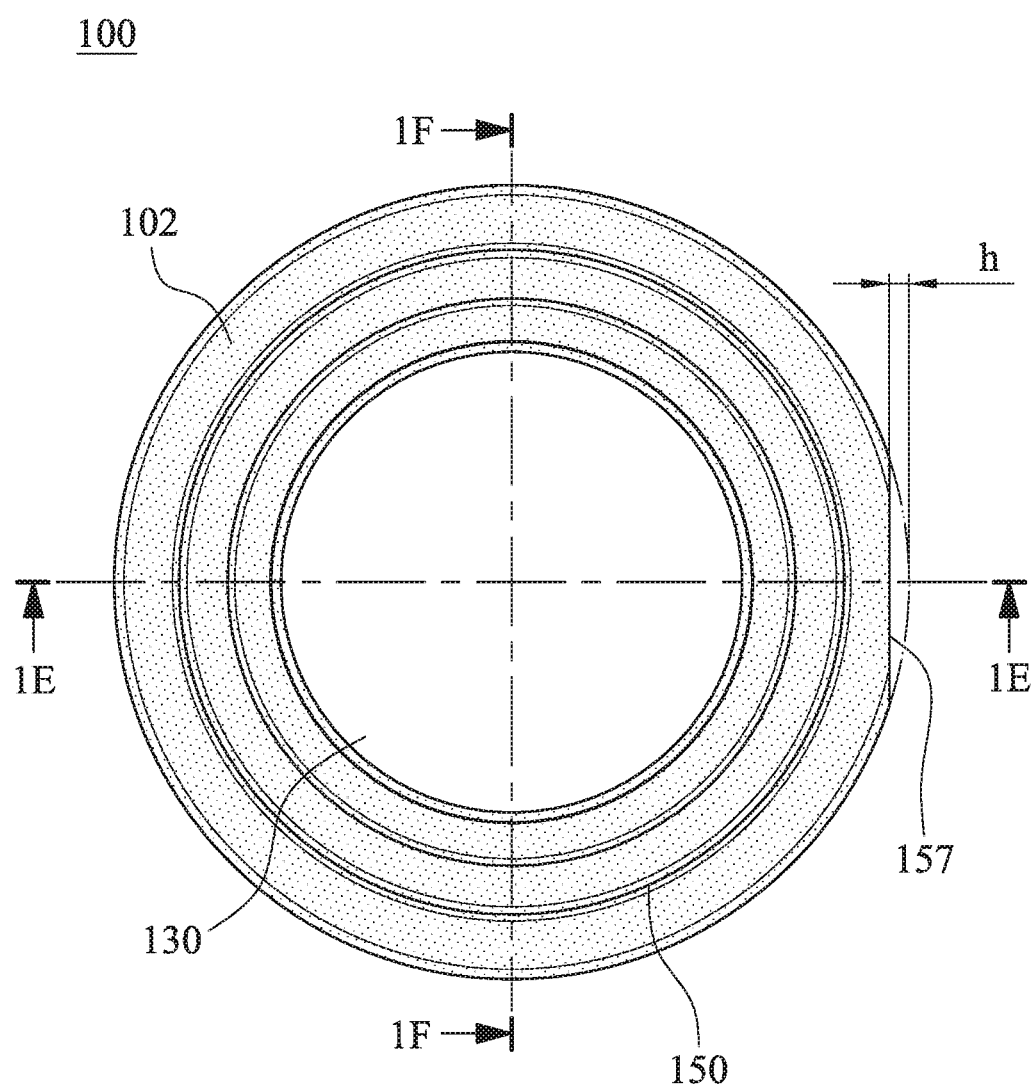
FIG. 1D is a top view of the dual molded lens element according to FIG. 1C.
Figure 1E:
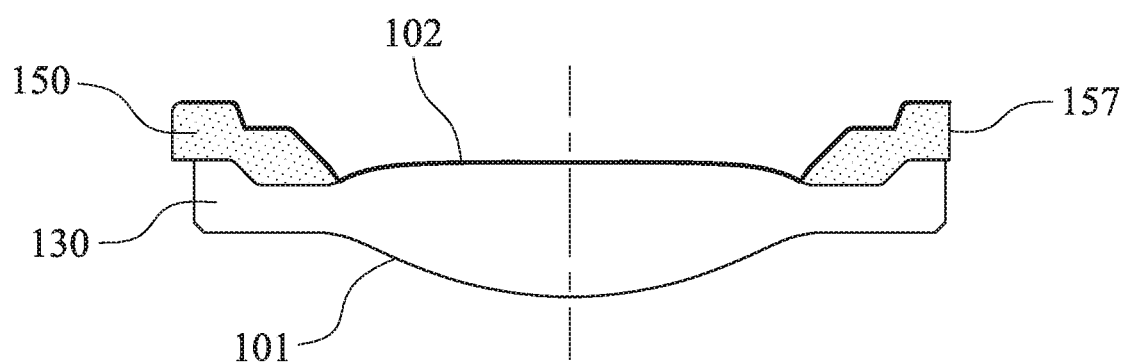
FIG. 1E is a cross-sectional view along line 1E-1E of FIG. 1D.

FIG. 1D is a top view of the dual molded lens element 100 according to FIG. 1C, and FIG. 1E is a cross-sectional view along line 1E-1E of FIG. 1D. In FIG. 1C to FIG. 1E, the second annular surface 155 of the light absorbing portion 150 can include a recessed portion 157, which is a part of the second annular surface 155 recessed towards an optical axis of the imaging lens assembly 1000. A distance from one point on the recessed portion 157 to the optical axis is smaller than a distance from one point on the second annular surface 155 outside the recessed portion 157 to the optical axis. Therefore, it is favorable for identifying the position of the dual molded lens element 100 by the features of the recessed portion 157 in the automated production process of the imaging lens assembly 1000.

In FIG. 1D, when a maximum difference between the distance from one point on the second annular surface 155 to the optical axis and the distance from one point on the recessed portion 157 to the optical axis is h, the following condition can be satisfied: 0.05 mm<h<0.30 mm. Therefore, it is favorable for maintaining a specific recess level so as to achieve better light blocking effect. Furthermore, the opening 154 of the light absorbing portion 150 is circular.

In FIG. 1C, the recessed portion 157 of the second annular surface 155 can be disposed correspondingly to the gate trace 136 of the first annular surface 135. Therefore, it is favorable for making the cutting process more easily in the automated production of the imaging lens assembly 1000.

Figure 1F:
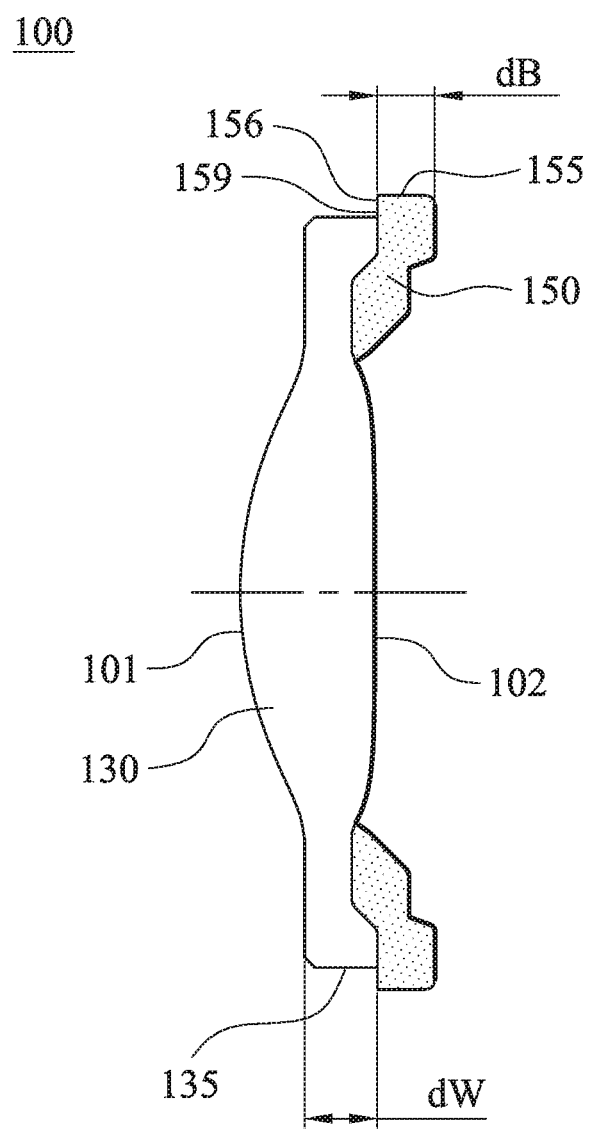
FIG. 1F is a cross-sectional view along line 1F-1F of FIG. 1D.

FIG. 1F is a cross-sectional view along line 1F-1F of FIG. 1D. In FIG. 1F, when a width parallel to the optical axis of the second annular surface 155 is dB, the following condition can be satisfied: 0.05 mm<dB<0.60 mm. Therefore, it is favorable for maintaining the stable dimensional accuracy of the dual molded lens element 100.

When a width parallel to the optical axis of the first annular surface 135 is dW, and the width parallel to the optical axis of the second annular surface 155 is dB, the following condition can be satisfied: 0.4<dB/dW<2.0. Therefore, it is favorable for maintaining a stable and planar overall structure of the dual molded lens element 100 so as to prevent the dual molded lens element 100 from being too thin and warpage.

The step surface 156 of the second annular surface 155 can include a flat surface 159, which is orthogonal to the optical axis of the imaging lens assembly 1000. Therefore, it is favorable for the mold design of injection molding of the dual molded lens element 100.

Furthermore, in FIG. 1A, when a number of the lens elements of the imaging lens assembly 1000 is N, the following condition can be satisfied: 5≤N<10. Therefore, it is favorable for obtaining better image resolution of the imaging lens assembly 1000 so as to satisfy more photographing requirements. In the 1st embodiment, the imaging lens assembly 1000 includes, in order from an object side to an image side, the dual molded lens element 100, lens elements 1101, 1102, 1103, 1104 and the dual molded lens element 200. The imaging lens assembly 1000 has a total of six lens elements. In other embodiments (not shown herein), the imaging lens assembly can have a total of five, seven, eight or more lens elements. Furthermore, the imaging lens assembly 1000 can further include a barrel 1200, wherein the six lens elements of the imaging lens assembly 1000 can be disposed in the barrel 1200 so as to block a lot of stray light. It is favorable for avoiding the stray light entering the portions of the lens element other than the effective optical section and preventing from unnecessary reflection among the lens elements.

The data of the aforementioned parameters of the imaging lens assembly 1000 and the dual molded lens element 100 according to the 1st embodiment of the present disclosure are listed in the following Table 1, wherein the parameters are also shown as FIG. 1B, FIG. 1D and FIG. 1F.

TABLE 1

| Dual Molded Lens Element 100 of 1st Embodiment | | | |
|---|---|---|---|
| dB (mm) | 0.29 | ψW (mm) | 3.78 |
| dW (mm) | 0.37 | dB/dW | 0.78 |
| h (mm) | 0.10 | (ψB − ψW)/2 (mm) | 0.11 |

TABLE 1-continued

Dual Molded Lens Element 100 of 1st Embodiment

| N | 6 | ψW/ψB | 0.95 |
|---|---|---|---|
| ψB (mm) | 4.00 | | |

Figure 1G:
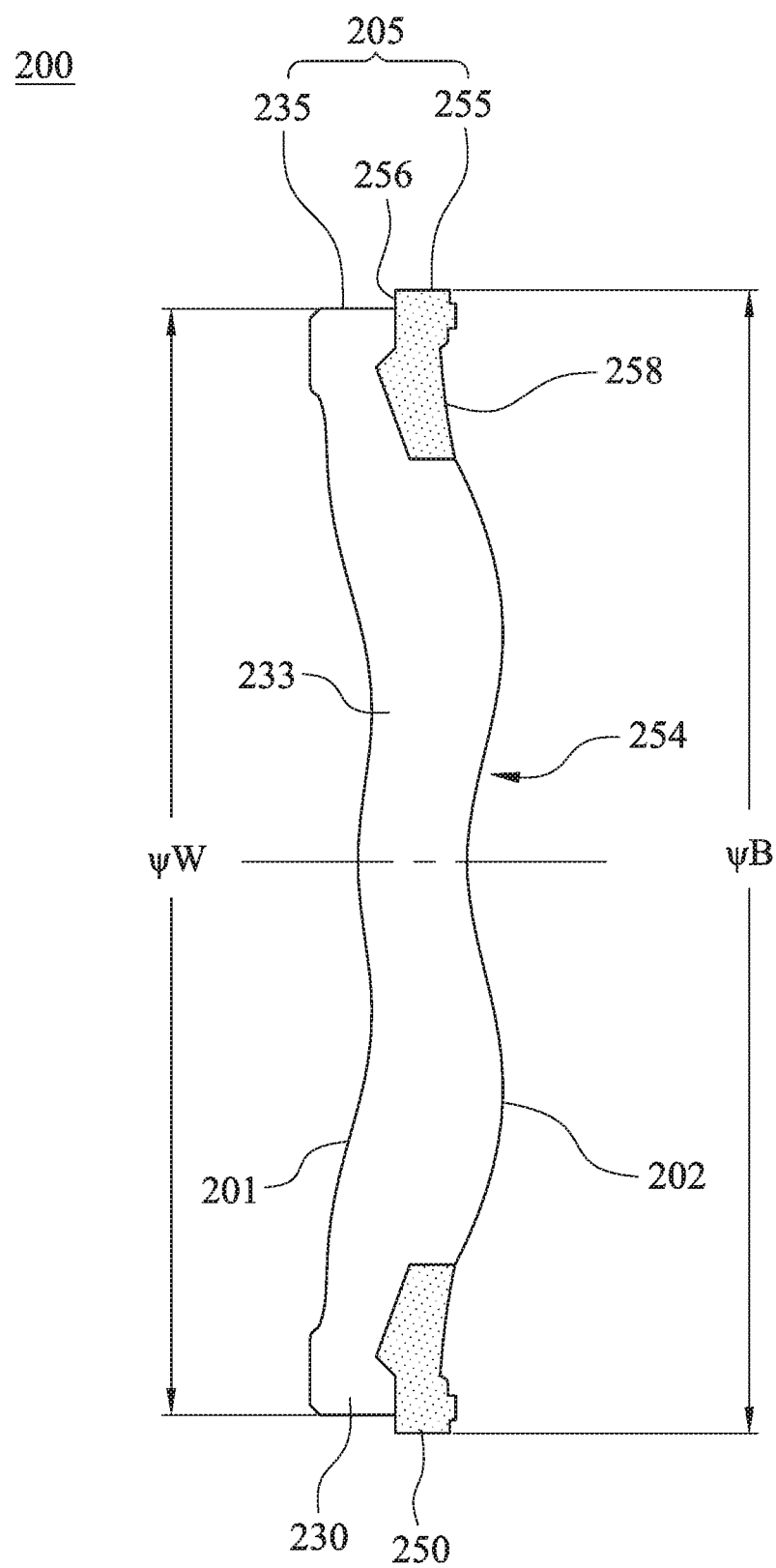
FIG. 1G is a schematic view of another dual molded lens element according to the 1st embodiment.

FIG. 1G is a schematic view of the dual molded lens element 200 according to the 1st embodiment. In FIG. 1A and FIG. 1G, the dual molded lens element 200 includes a light transmitting portion 230 and a light absorbing portion 250, wherein the light transmitting portion 230 and the light absorbing portion 250 of the dual molded lens element 200 are formed by a dual-shot injection molding method.

The dual molded lens element 200 has an object-side surface 201, an image-side surface 202 and a lens annular surface 205. The object-side surface 201 is a surface facing the imaged object of the dual molded lens element 200. The image-side surface 202 is a surface facing the image surface of the dual molded lens element 200. The lens annular surface 205 connects the object-side surface 201 and the image-side surface 202, and has an annular shape.

The light transmitting portion 230 includes an effective optical section 233 and a first annular surface 235, wherein the incident light passes through the effective optical section 233 and forms the image on the image surface. The first annular surface 235 is located on the lens annular surface 205 of the dual molded lens element 200.

The light absorbing portion 250 is located on one surface of the object-side surface 201 and the image-side surface 202 of the dual molded lens element 200 (the aforementioned surface is the image-side surface 202 in the dual molded lens element 200 of the 1st embodiment), wherein a plastic material and a color of the light absorbing portion 250 are different from a plastic material and a color of the light transmitting portion 230. In the dual molded lens element 200 of the 1st embodiment, the plastic material of the light absorbing portion 250 has the feature of absorbing visible light, and the color of the light absorbing portion 250 is black. The plastic material of the light transmitting portion 230 has the feature of being transmitted by visible light, and the color of the light transmitting portion 230 is transparent and colorless. Hence, the plastic material and the color of the light absorbing portion 250 are different from the plastic material and the color of the light transmitting portion 230.

In FIG. 1G, the light absorbing portion 250 includes an opening 254 and a second annular surface 255. The opening 254 is disposed correspondingly to the effective optical section 233, so that the incident light could pass through the effective optical section 233 and forms the image on the image surface.

The second annular surface 255 is located on the lens annular surface 205 of the dual molded lens element 200 and connected to the first annular surface 235, wherein a step surface 256 of the second annular surface 255 is formed by the first annular surface 235 and the second annular surface 255. That is, a part of the second annular surface 255 is protruded more than a corresponding part of the first annular surface 235, so that the step surface 256 of the second annular surface 255 is formed by the first annular surface 235 and the second annular surface 255. Therefore, it is favorable for suppressing the stray light so as to further enhance the image quality, and further balance the compact size and the light blocking efficiency of the imaging lens assembly 1000 by the two dual molded lens elements 100 and 200.

In detail, two surfaces of the effective optical section 233 of the light transmitting portion 230 are both aspheric. That is, a part of the effective optical section 233 located on the object-side surface 201 and a part of the effective optical section 233 located on the image-side surface 202 of the dual molded lens element 200 are both aspheric.

The light absorbing portion 250 further includes an anti-reflection coating 258 (not shown with a bold line as the anti-reflection coating 158 in the 1st embodiment). The anti-reflection coating 258 is coated on all area of a surface of the light absorbing portion 250 located on the image-side surface 202 of the dual molded lens element 200, which is not in contact with the light transmitting portion 230.

Figure 1H:
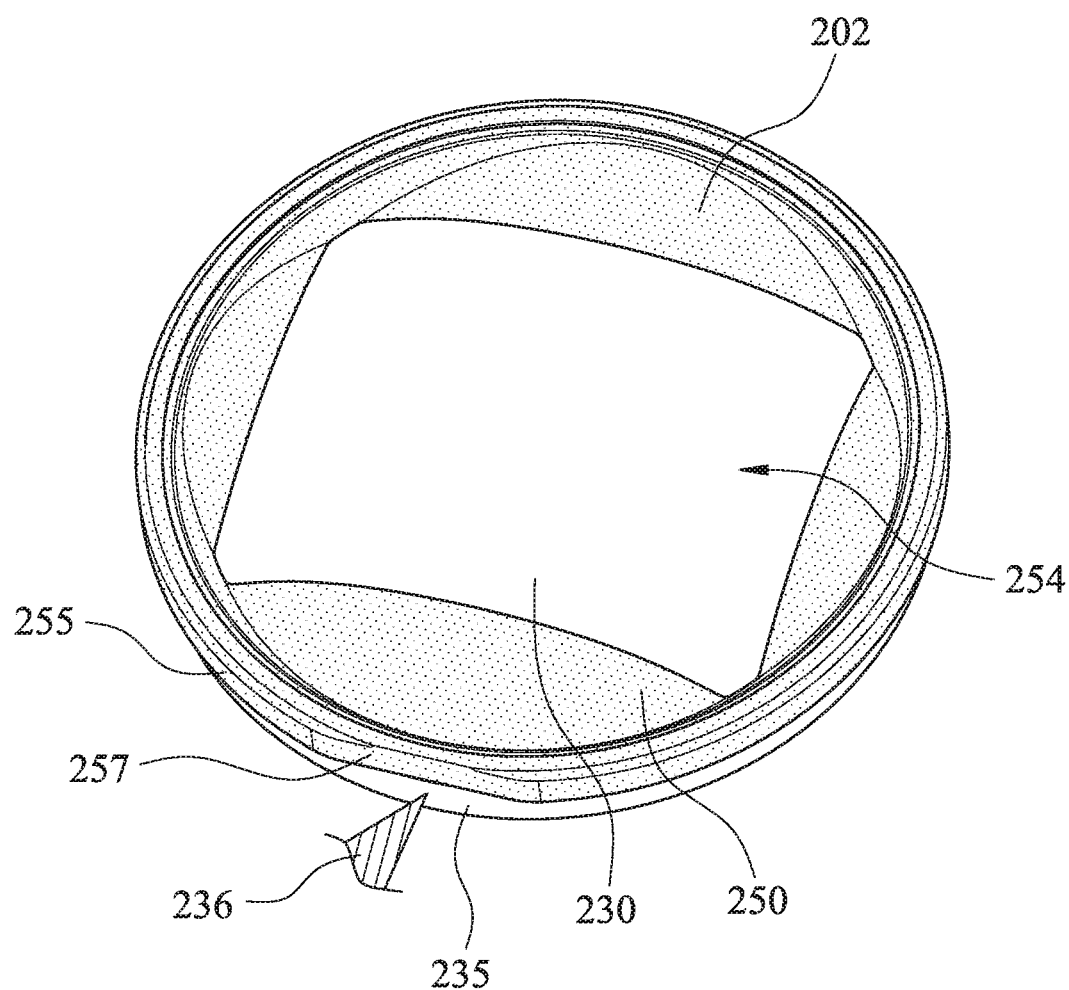
FIG. 1H is a three-dimensional view of the another dual molded lens element according to the 1st embodiment.
Figure 1J:
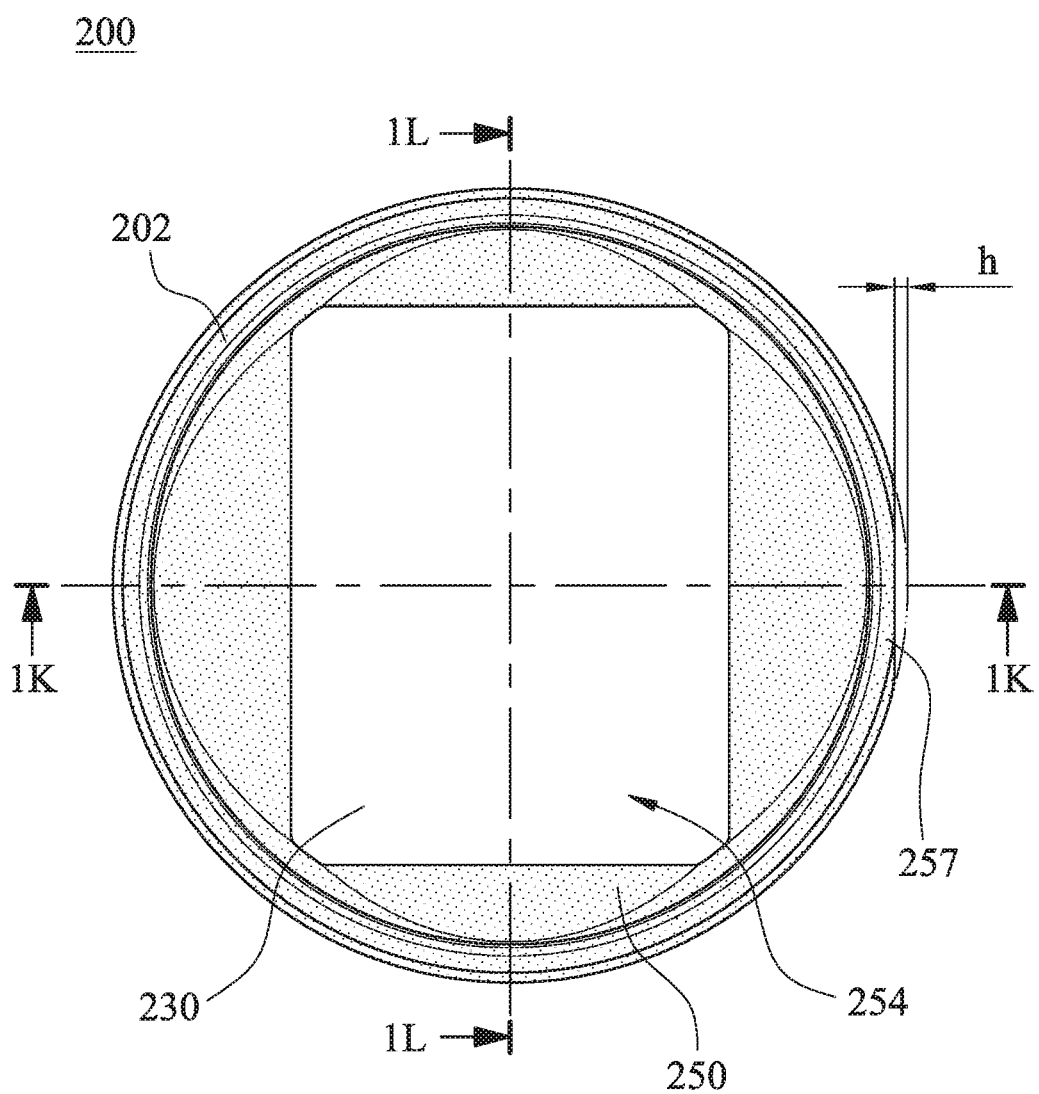
FIG. 1J is a top view of the dual molded lens element according to FIG. 1H.

FIG. 1H is a three-dimensional view of the dual molded lens element 200 according to the 1st embodiment, and FIG. 1J is a top view of the dual molded lens element 200 according to FIG. 1H. In FIG. 1H and FIG. 1J, the opening 254 of the light absorbing portion 250 is non-circular. Therefore, it is favorable for enlarging the range of blocking stray light of the dual molded lens element 200 without affecting imaging properties, and improving the manufacturing yield rate. In the dual molded lens element 200 of the 1st embodiment, the opening 254 is polygon. Therefore, it is favorable for increasing the contact area between the light transmitting portion 230 and the light absorbing portion 250 so as to improve the manufacturing yield rate of the dual molded lens element 200 and enhance the imaging quality.

Figure 1K:
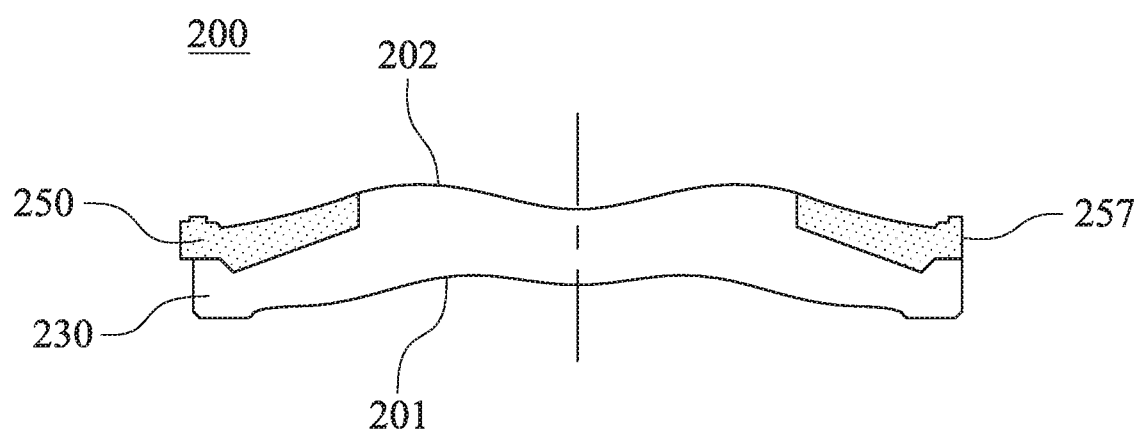
FIG. 1K is a cross-sectional view along line 1K-1K of FIG. 1J.

FIG. 1K is a cross-sectional view along line 1K-1K of FIG. 1J. In FIG. 1H to FIG. 1K, the first annular surface 235 of the light transmitting portion 230 includes a gate trace 236. The second annular surface 255 of the light absorbing portion 250 includes a recessed portion 257, which is a part of the second annular surface 255 recessed towards the optical axis of the imaging lens assembly 1000. A distance from one point on the recessed portion 257 to the optical axis is smaller than a distance from one point on the second annular surface 255 outside the recessed portion 257 to the optical axis.

In FIG. 1H, the recessed portion 257 of the second annular surface 255 is disposed correspondingly to the gate trace 236 of the first annular surface 235.

Figure 1L:
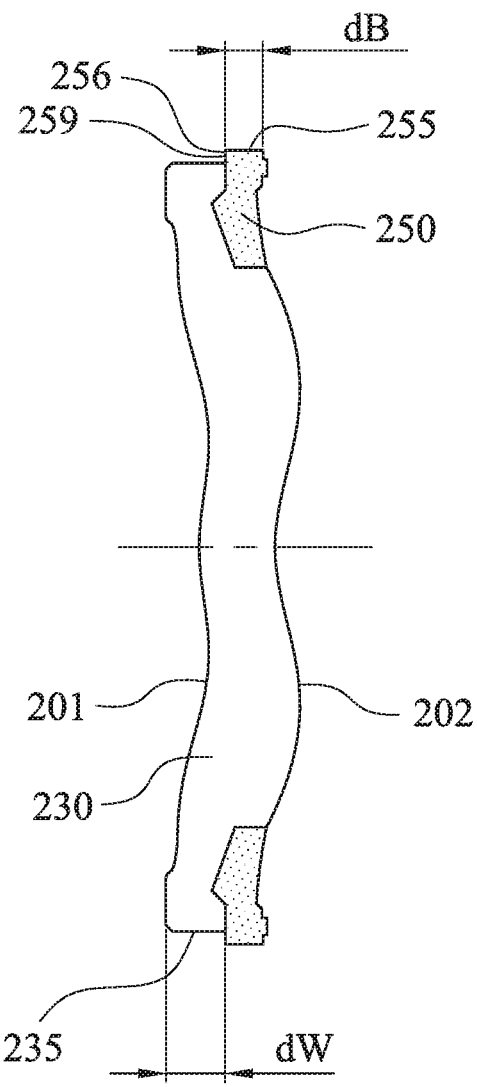
FIG. 1L is a cross-sectional view along line 1L-1L of FIG. 1J.

FIG. 1L is a cross-sectional view along line 1L-1L of FIG. 1J. In FIG. 1L, the step surface 256 of the second annular surface 255 includes a flat surface 259, which is orthogonal to the optical axis of the imaging lens assembly 1000.

The data of the parameters dB, dW, h, N, ψB, ψW, dB/dW, (ψB−ψW)/2 and ψW/ψB of the imaging lens assembly 1000 and the dual molded lens element 200 according to the 1st embodiment of the present disclosure are listed in the following Table 2, wherein the parameters are also shown as FIG. 1G, FIG. 1J and FIG. 1L. The definitions of these parameters shown in Table 2 are the same as those stated in the dual molded lens element 100 of the 1st embodiment with corresponding values for the dual molded lens element 200.

TABLE 2

Dual Molded Lens Element 200 of 1st Embodiment

| dB (mm) | 0.28 | ψW (mm) | 5.70 |
|---|---|---|---|
| dW (mm) | 0.44 | dB/dW | 0.64 |
| h (mm) | 0.10 | (ψB − ψW)/2 (mm) | 0.09 |
| N | 6 | ψW/ψB | 0.97 |
| ψB (mm) | 5.89 | | |

2nd Embodiment

Figure 2A:
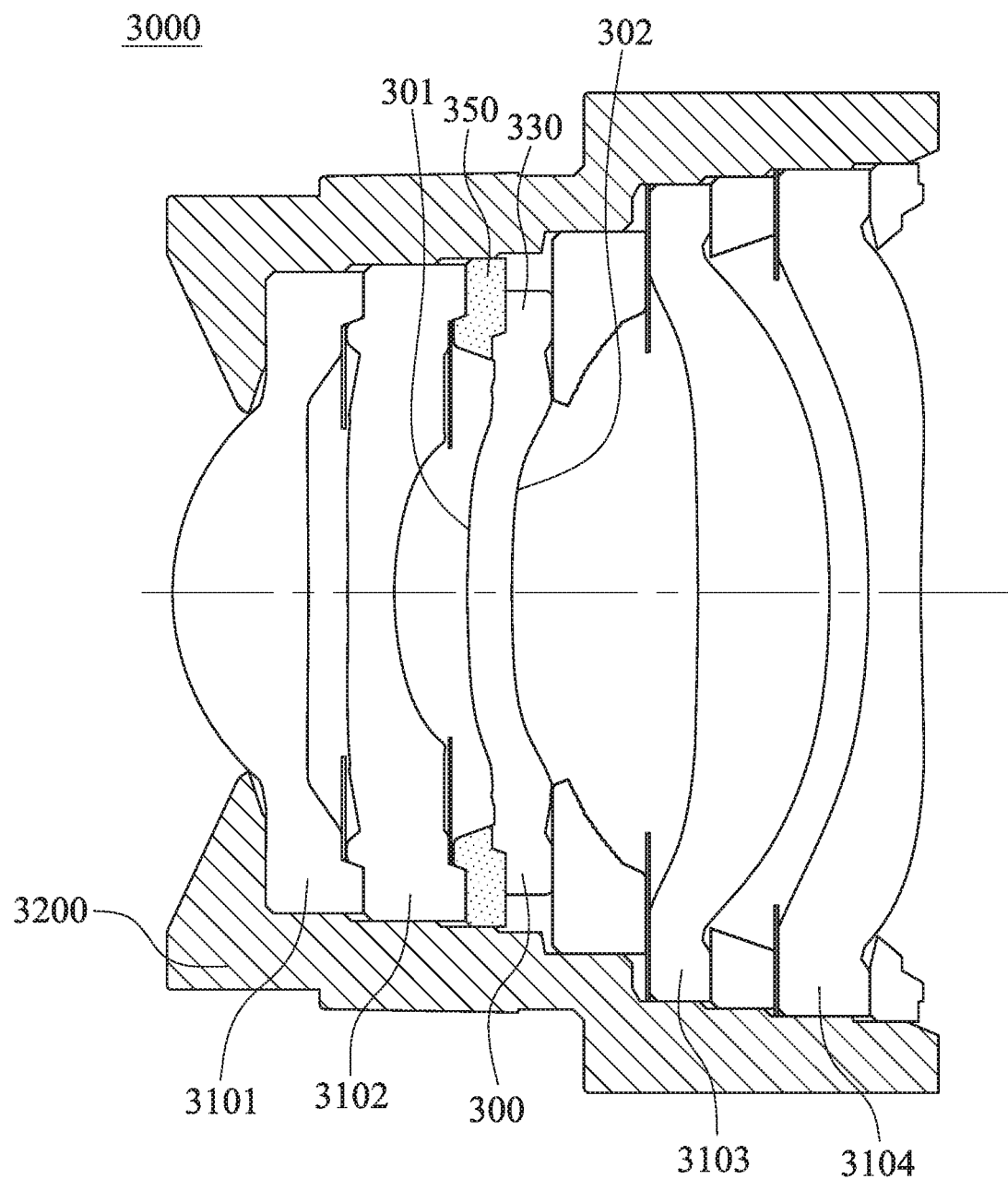
FIG. 2A is a schematic view of an imaging lens assembly according to the 2nd embodiment of the present disclosure.

FIG. 2A is a schematic view of an imaging lens assembly 3000 according to the 2nd embodiment of the present disclosure. In FIG. 2A, the imaging lens assembly 3000 includes a plurality of lens elements, wherein one of the lens elements are a dual molded lens element 300.

Figure 2B:
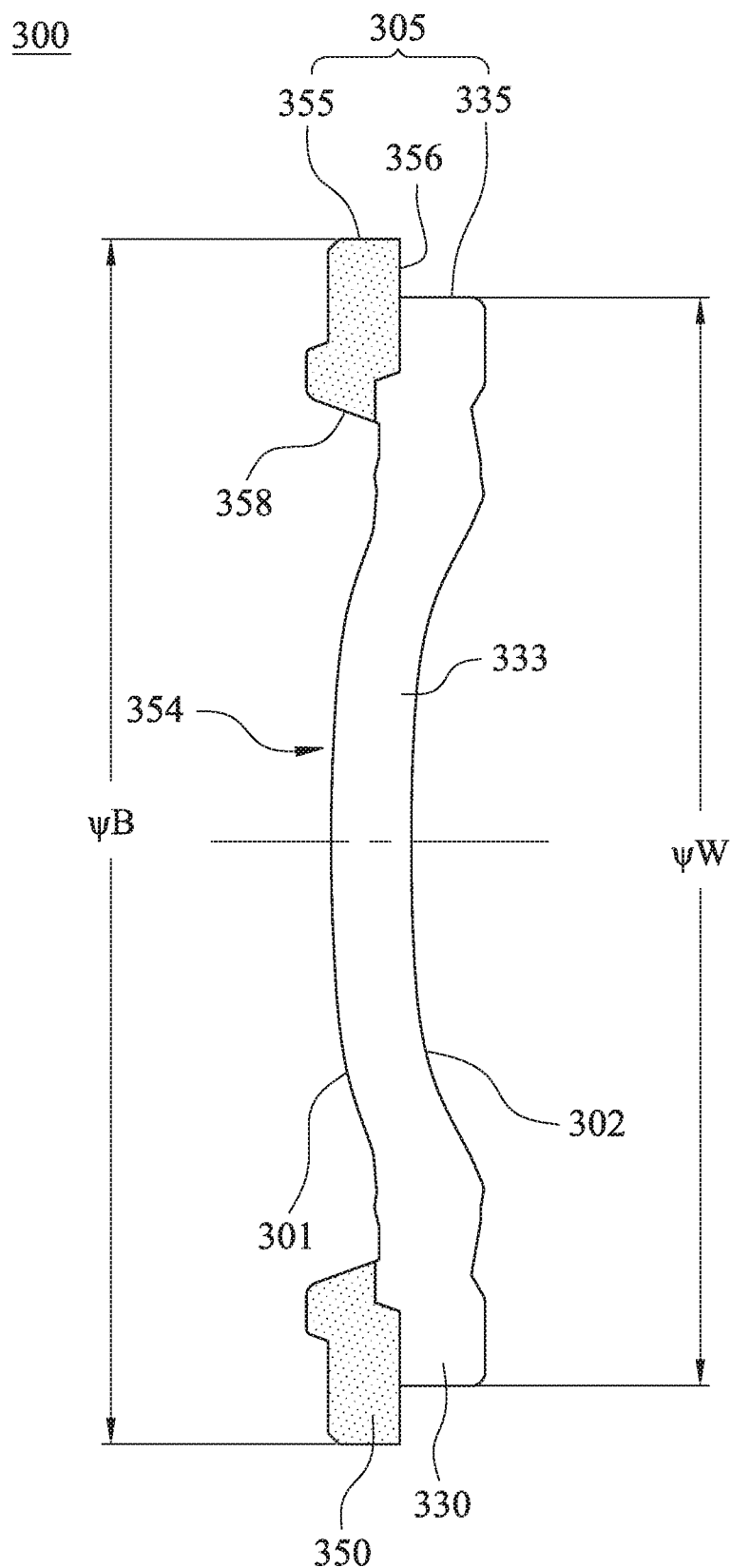
FIG. 2B is a schematic view of a dual molded lens element according to the 2nd embodiment.

FIG. 2B is a schematic view of the dual molded lens element 300 according to the 2nd embodiment. In FIG. 2A and FIG. 2B, the dual molded lens element 300 includes a light transmitting portion 330 and a light absorbing portion 350, wherein the light transmitting portion 330 and the light absorbing portion 350 of the dual molded lens element 300 are formed by a dual-shot injection molding method.

The dual molded lens element 300 has an object-side surface 301, an image-side surface 302 and a lens annular surface 305. The object-side surface 301 is a surface facing an imaged object (not shown herein) of the dual molded lens element 300. The image-side surface 302 is a surface facing an image surface (not shown herein) of the dual molded lens element 300. The lens annular surface 305 connects the object-side surface 301 and the image-side surface 302, and has an annular shape.

The light transmitting portion 330 includes an effective optical section 333 and a first annular surface 335, wherein the incident light passes through the effective optical section 333 and forms the image on the image surface. The first annular surface 335 is located on the lens annular surface 305 of the dual molded lens element 300.

The light absorbing portion 350 is located on one surface of the object-side surface 301 and the image-side surface 302 of the dual molded lens element 300 (the aforementioned surface is the object-side surface 301 in the dual molded lens element 300 of the 2nd embodiment), wherein a plastic material and a color of the light absorbing portion 350 are different from a plastic material and a color of the light transmitting portion 330. In the dual molded lens element 300 of the 2nd embodiment, the plastic material of the light absorbing portion 350 has the feature of absorbing visible light, and the color of the light absorbing portion 350 is black. The plastic material of the light transmitting portion 330 has the feature of being transmitted by visible light, and the color of the light transmitting portion 330 is transparent and colorless. Hence, the plastic material and the color of the light absorbing portion 350 are different from the plastic material and the color of the light transmitting portion 330.

In FIG. 2B, the light absorbing portion 350 includes an opening 354 and a second annular surface 355. The opening 354 is disposed correspondingly to the effective optical section 333, so that the incident light could pass through the effective optical section 333 and forms the image on the image surface.

The second annular surface 355 is located on the lens annular surface 305 of the dual molded lens element 300 and connected to the first annular surface 335, wherein a step surface 356 of the second annular surface 355 is formed by the first annular surface 335 and the second annular surface 355. That is, a part of the second annular surface 355 is protruded more than a corresponding part of the first annular surface 335, so that the step surface 356 of the second annular surface 355 is formed by the first annular surface 335 and the second annular surface 355.

In detail, two surfaces of the effective optical section 333 of the light transmitting portion 330 are both aspheric. That is, a part of the effective optical section 333 located on the object-side surface 301 and a part of the effective optical section 333 located on the image-side surface 302 of the dual molded lens element 300 are both aspheric.

The light absorbing portion 350 further includes an anti-reflection coating 358 (not shown with a bold line as the anti-reflection coating 158 in the 1st embodiment). The anti-reflection coating 358 is coated on all area of a surface of the light absorbing portion 350 located on the object-side surface 301 of the dual molded lens element 300, which is not in contact with the light transmitting portion 330.

Figure 2C:
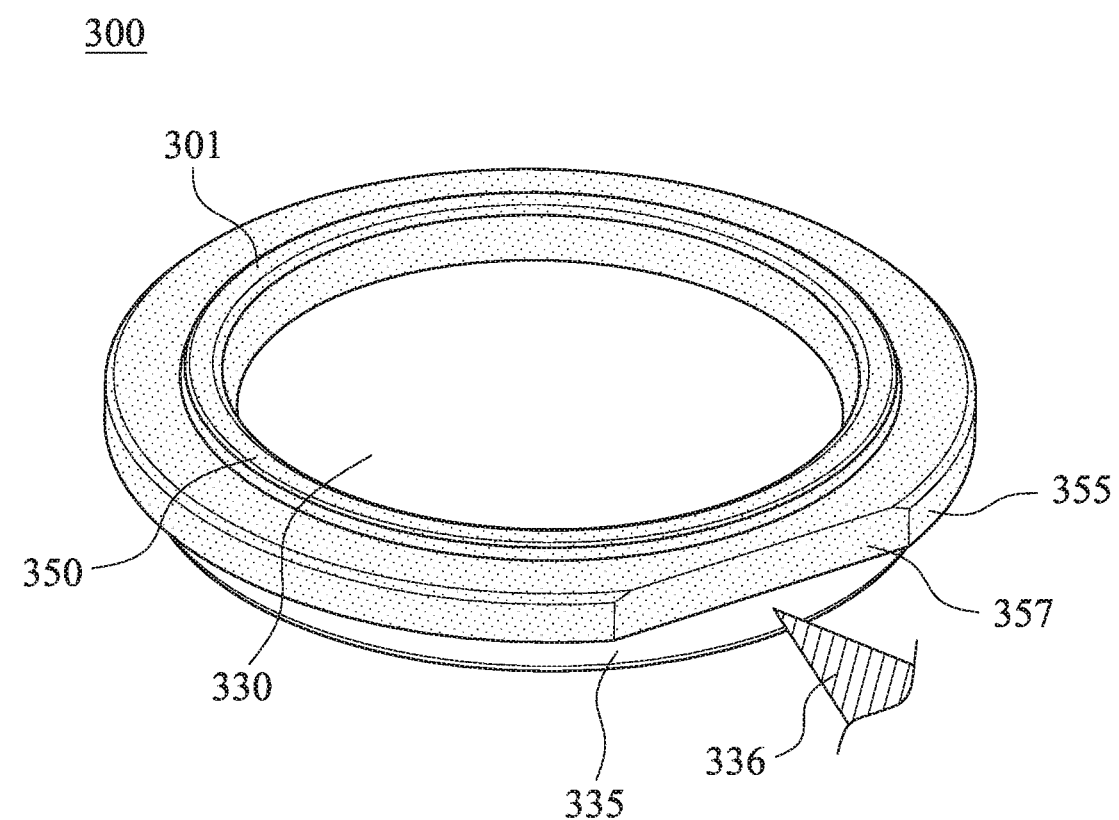
FIG. 2C is a three-dimensional view of the dual molded lens element according to the 2nd embodiment.

FIG. 2C is a three-dimensional view of the dual molded lens element 300 according to the 2nd embodiment. In FIG. 2C, the first annular surface 335 of the light transmitting portion 330 includes a gate trace 336.

Figure 2D:
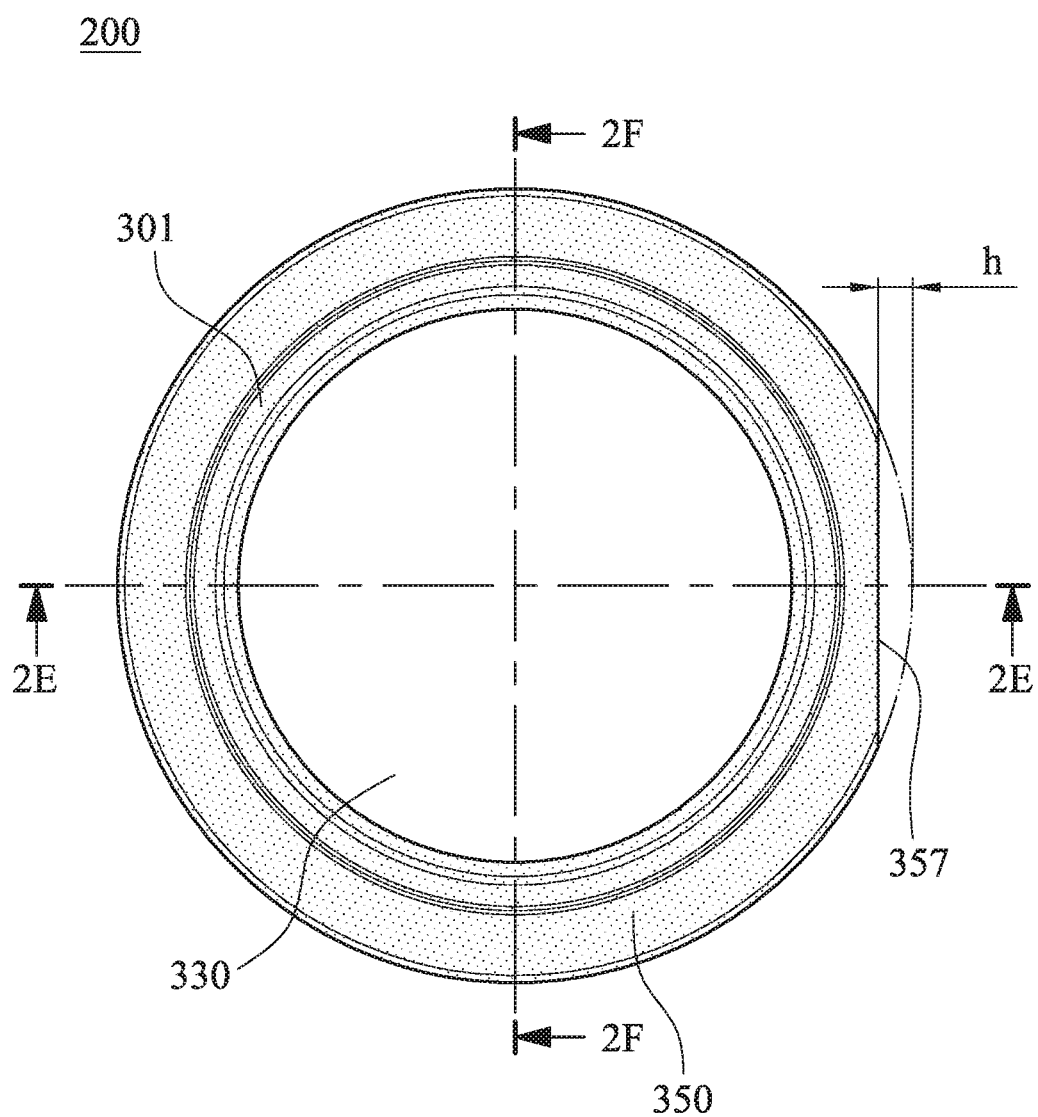
FIG. 2D is a top view of the dual molded lens element according to FIG. 2C.

FIG. 2D is a top view of the dual molded lens element 300 according to FIG. 2C. In FIG. 2D, the opening 354 of the light absorbing portion 350 is circular.

Figure 2E:
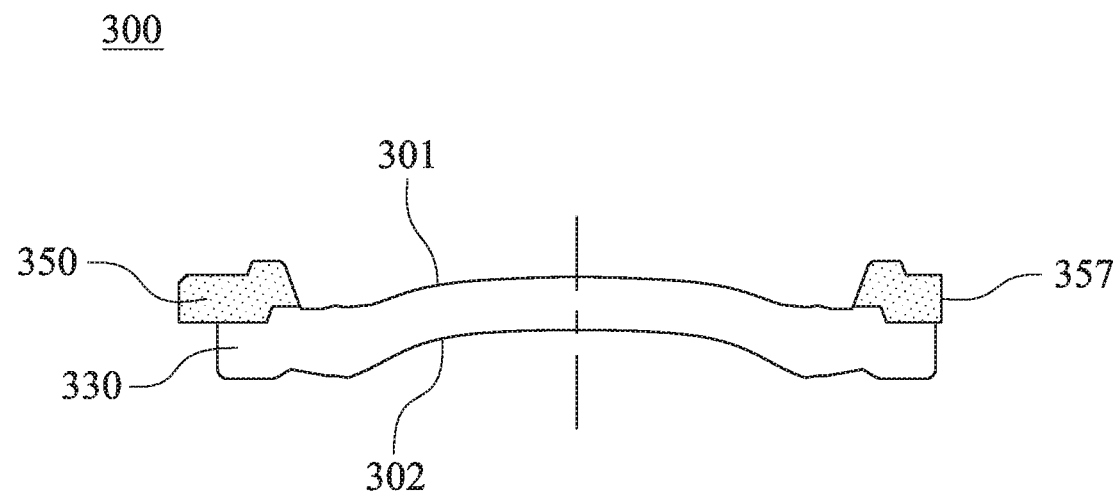
FIG. 2E is a cross-sectional view along line 2E-2E of FIG. 2D.

FIG. 2E is a cross-sectional view along line 2E-2E of FIG. 2D. In FIG. 2C to FIG. 2E, the second annular surface 355 of the light absorbing portion 350 includes a recessed portion 357, which is a part of the second annular surface 355 recessed towards an optical axis of the imaging lens assembly 3000. A distance from one point on the recessed portion 357 to the optical axis is smaller than a distance from one point on the second annular surface 355 outside the recessed portion 357 to the optical axis.

In FIG. 2C, the recessed portion 357 of the second annular surface 355 is disposed correspondingly to the gate trace 336 of the first annular surface 335.

Figure 2F:
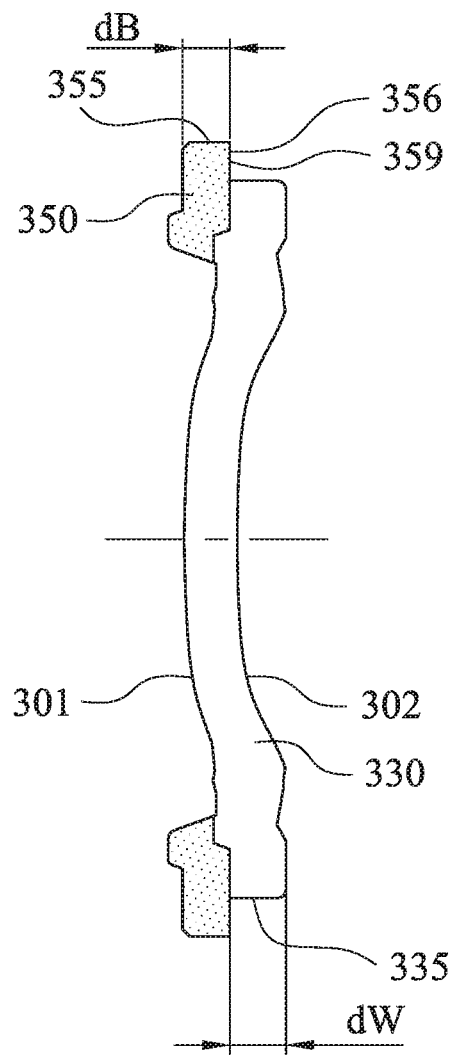
FIG. 2F is a cross-sectional view along line 2F-2F of FIG. 2D.

FIG. 2F is a cross-sectional view along line 2F-2F of FIG. 2D. In FIG. 2F, the step surface 356 of the second annular surface 355 includes a flat surface 359, which is orthogonal to the optical axis of the imaging lens assembly 3000.

Furthermore, in FIG. 2A, the imaging lens assembly 3000 includes, in order from an object side to an image side, lens elements 3101, 3102, the dual molded lens element 300, lens elements 3103 and 3104. The imaging lens assembly 3000 has a total of five lens elements. Furthermore, the imaging lens assembly 3000 further includes a barrel 3200, wherein the five lens elements of the imaging lens assembly 3000 is disposed in the barrel 3200.

The data of the parameters dB, dW, h, N, ψB, ψW, dB/dW, (ψB−ψW)/2 and ψW/ψB of the imaging lens assembly 3000 according to the 2nd embodiment of the present disclosure are listed in the following Table 3, wherein the parameters are also shown as FIG. 2B, FIG. 2D and FIG. 2F. The definitions of these parameters shown in Table 3 are the same as those stated in the dual molded lens element 100 of the 1st embodiment with corresponding values for the imaging lens assembly 3000.

TABLE 3

| 2nd Embodiment | | | |
|---|---|---|---|
| dB (mm) | 0.26 | ψW (mm) | 3.96 |
| dW (mm) | 0.31 | dB/dW | 0.84 |
| h (mm) | 0.19 | (ψB − ψW)/2 (mm) | 0.21 |
| N | 5 | ψW/ψB | 0.90 |
| ψB (mm) | 4.38 | | |

3rd Embodiment

Figure 3:
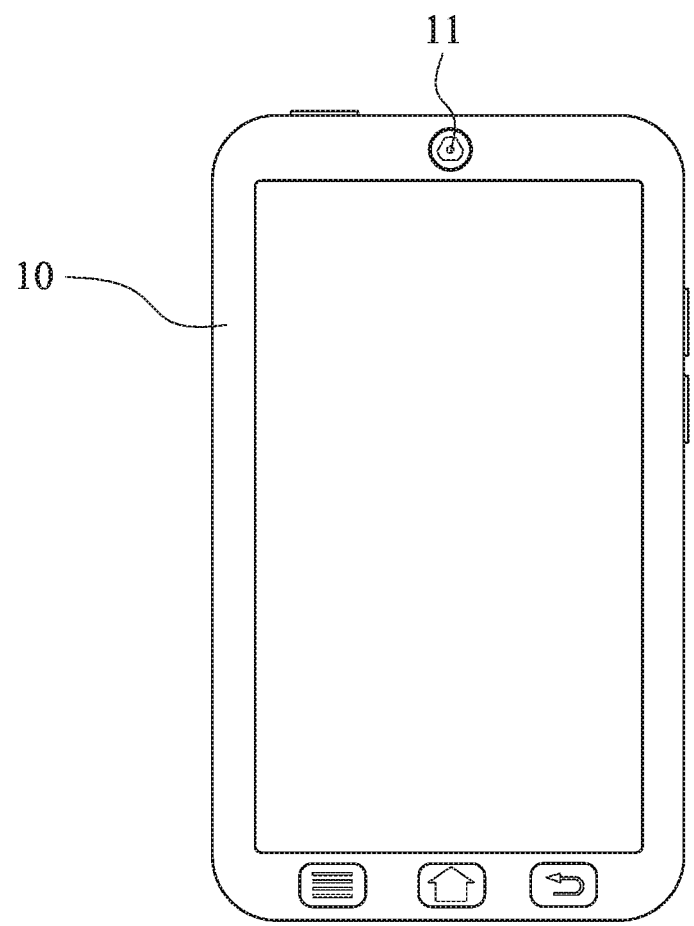
FIG. 3 shows an electronic device according to the 3rd embodiment of the present disclosure.

FIG. 3 shows an electronic device 10 according to the 3rd embodiment of the present disclosure. The electronic device 10 of the 3rd embodiment is a smart phone, wherein the electronic device 10 includes an imaging lens module 11. The imaging lens module 11 includes an imaging lens assembly (not shown herein) according to the present disclosure. Therefore, it is favorable for improving the image quality so as to satisfy the requirements of high-end electronic devices with camera functionalities. Furthermore, the imaging lens module 11 can further include an image sensor (not shown herein) disposed on or near an image surface (not shown herein) of the imaging lens assembly. Preferably, the electronic device 10 can further include but not limited to a display, a control unit, a storage unit, a random access memory unit (RAM), a read-only memory unit (ROM) or a combination thereof.

4th Embodiment

Figure 4:
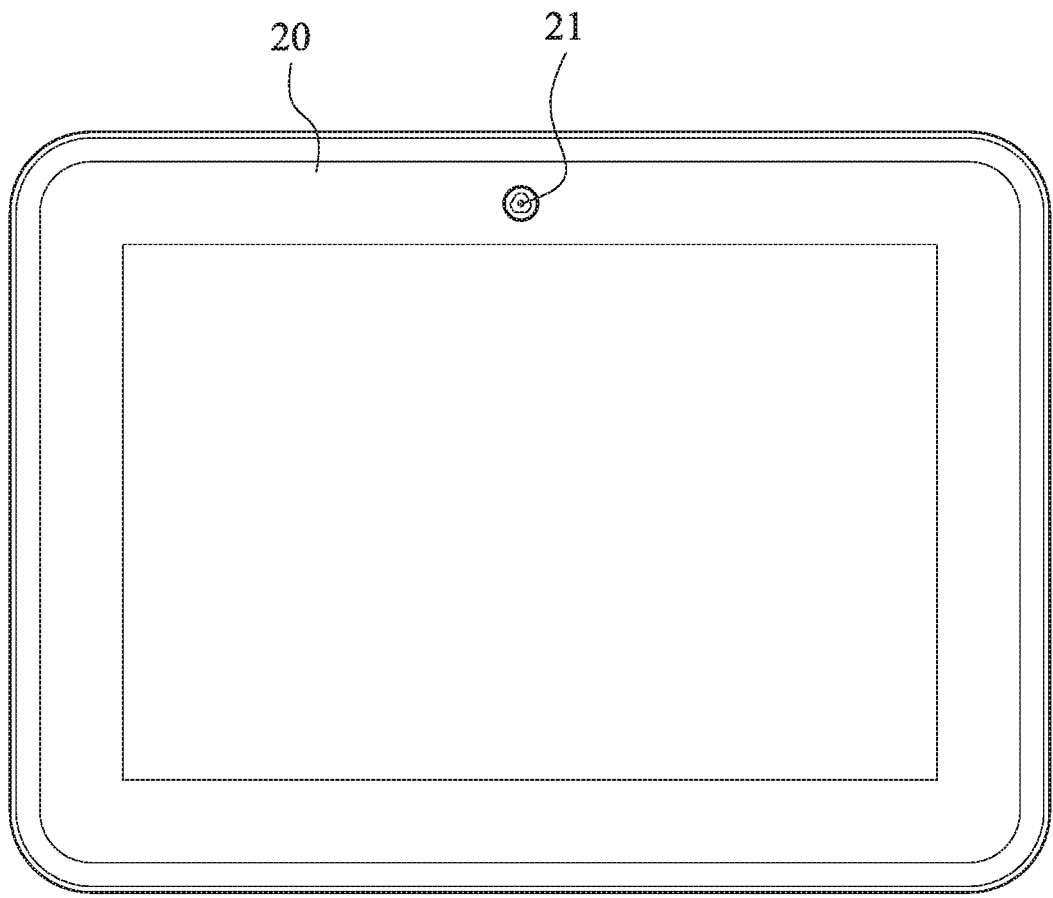
FIG. 4 shows an electronic device according to the 4th embodiment of the present disclosure.

FIG. 4 shows an electronic device 20 according to the 4th embodiment of the present disclosure. The electronic device 20 of the 4th embodiment is a tablet personal computer, wherein the electronic device 20 includes an imaging lens module 21. The imaging lens module 21 includes an imaging lens assembly (not shown herein) according to the present disclosure and an image sensor (not shown herein) disposed on or near an image surface (not shown herein) of the imaging lens assembly.

5th Embodiment

Figure 5:
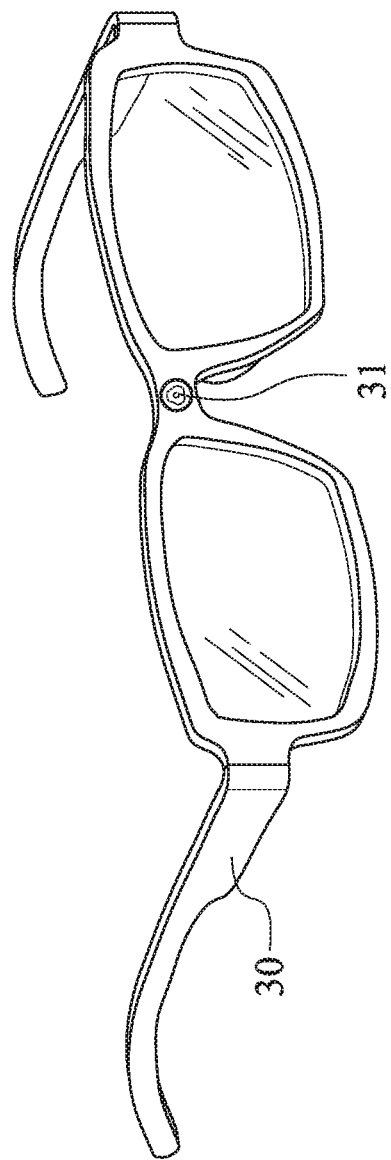
FIG. 5 shows an electronic device according to the 5th embodiment of the present disclosure.

FIG. 5 shows an electronic device 30 according to the 5th embodiment of the present disclosure. The electronic device 30 of the 5th embodiment is a wearable device, wherein the electronic device 30 includes an imaging lens module 31. The imaging lens module 31 includes an imaging lens assembly (not shown herein) according to the present disclosure and an image sensor (not shown herein) disposed on or near an image surface (not shown herein) of the imaging lens assembly.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An imaging lens assembly, comprising a plurality of lens elements, wherein at least one of the lens elements is a dual molded lens element, and the dual molded lens element comprises:
a molded light transmitting portion comprising:
an effective optical section; and
a first annular surface located on a lens annular surface of the dual molded lens element, wherein the lens annular surface connects an object-side surface and an image-side surface of the dual molded lens element; and
a molded light absorbing portion located on at least one surface of the object-side surface and the image-side surface of the dual molded lens element, wherein a plastic material and a color of the molded light absorbing portion are different from a plastic material and a color of the molded light transmitting portion, and the molded light absorbing portion comprises:
an opening disposed correspondingly to the effective optical section; and
a second annular surface, which is located on the lens annular surface of the dual molded lens element and connected to the first annular surface, wherein a step surface of the second annular surface is formed by the first annular surface and the second annular surface, and the step surface is exposed to an air;
wherein the first annular surface is not overlapped with the second annular surface in a direction orthogonal to the first annular surface and the second annular surface by the step surface;
wherein a maximum outer diameter of the molded light transmitting portion is $\psi W$, a maximum outer diameter of the molded light absorbing portion is $\psi B$, and the following condition is satisfied:

$\psi B > \psi W.$

2. The imaging lens assembly of claim 1, wherein the molded light transmitting portion and the molded light absorbing portion are formed by a dual-shot injection molding method.

3. The imaging lens assembly of claim 2, wherein the first annular surface comprises a gate trace.

4. The imaging lens assembly of claim 3, wherein the second annular surface comprises a recessed portion.

5. The imaging lens assembly of claim 4, wherein a maximum difference between a distance from one point on the second annular surface to an optical axis and a distance from one point on the recessed portion to the optical axis is h, and the following condition is satisfied:

0.05 mm<h<0.30 mm.

6. The imaging lens assembly of claim 4, wherein the recessed portion is disposed correspondingly to the gate trace of the first annular surface.

7. The imaging lens assembly of claim 2, wherein a width parallel to an optical axis of the second annular surface is dB, and the following condition is satisfied:

0.05 mm<dB<0.60 mm.

8. The imaging lens assembly of claim 7, wherein the step surface comprises a flat surface, which is orthogonal to the optical axis.

9. The imaging lens assembly of claim 2, wherein the maximum outer diameter of the molded light transmitting portion is $\psi W$, the maximum outer diameter of the molded light absorbing portion is $\psi B$, and the following condition is satisfied:

0.03 mm<($\psi B$−$\psi W$)/2<0.42 mm.

10. The imaging lens assembly of claim 2, wherein at least one of two surfaces of the effective optical section is aspheric.

11. The imaging lens assembly of claim 2, wherein a number of the lens elements of the imaging lens assembly is N, and the following condition is satisfied:

5≤N<10.

12. The imaging lens assembly of claim 2, wherein the molded light absorbing portion further comprises:
an anti-reflection coating coated on at least part of a surface of the molded light absorbing portion, which is not in contact with the molded light transmitting portion.

13. The imaging lens assembly of claim 1, wherein the opening is non-circular.

14. An electronic device, comprising:
an imaging lens module comprising:
the imaging lens assembly of claim 1; and an image sensor, wherein the image sensor is disposed on an image surface of the imaging lens assembly.

\* \* \* \* \*